United States Patent [19]

Erickson et al.

[11] Patent Number: 4,662,669

[45] Date of Patent: May 5, 1987

[54] SPENT CATALYST CONTAINER

[75] Inventors: Michael E. Erickson, Country Club Hills; Roman T. Plichta, Naperville, both of Ill.; Daniel F. Rajanayakam, Houston, Tex.

[73] Assignee: Amoco Corporation, Chicago, Ill.

[21] Appl. No.: 782,054

[22] Filed: Sep. 30, 1985

[51] Int. Cl.⁴ ............... B65D 88/30; B65D 88/56
[52] U.S. Cl. ............... 294/68.27; 206/596; 220/1.5; 220/379; 222/166; 294/68.1; 414/608
[58] Field of Search ............ 294/68.1–68.22, 294/68.24–68.3; 206/524.6, 596, 598; 220/1.5, 85 CH, 326, 379; 222/164–166, 173, 180, 183, 184, 23, 51, 538; 414/419, 420, 422, 608

[56] References Cited

U.S. PATENT DOCUMENTS

| | | | |
|---|---|---|---|
| 1,745,548 | 2/1930 | Lerner | 220/85 CH X |
| 1,766,507 | 6/1930 | Coe | 294/68.1 |
| 1,794,714 | 3/1931 | Kiplinger | 294/68.27 X |
| 2,862,645 | 12/1958 | Page et al. | 222/184 X |
| 2,945,718 | 7/1960 | Smith | 220/326 X |
| 3,130,846 | 4/1964 | Wender | 294/68.26 X |
| 3,162,330 | 12/1964 | Dickson et al. | 414/608 X |
| 3,174,728 | 3/1965 | Mack | 222/173 X |
| 3,212,333 | 10/1965 | Tayama | 222/51 X |
| 3,220,612 | 11/1965 | Thomson | 222/166 |
| 3,318,473 | 5/1967 | Jones et al. | 294/68.21 X |

Primary Examiner—Johnny D. Cherry
Attorney, Agent, or Firm—Thomas W. Tolpin; William T. McClain; William H. Magidson

[57] ABSTRACT

A special spent catalyst container is provided to safely and effectively transport, store, and dispense spent catalyst and residual reactor oil from a resid hydrotreating unit to a reclamation site or disposal area. In order to protect and safeguard the environment, the container is constructed of a catalytically resistant oil-impermeable steel with a special shape and arrangement to prevent spent catalyst and residual reactor oil from the resid hydrotreating unit from spilling, leaking, and accumulating on the nation's highways. The spent catalyst container has a rotatable truncated bin with a support frame to enhance the structural strength and integrity of the bin. The bin has monorail and bridge crane-receiving slots to alternatively receive the grab hooks of a monorail and a bridge crane to facilitate transport by both monorail and the bridge crane. The bin also has upper and lower forklift channels to receive rotatable tines of a forklift truck to accommodate power-driven inversion of the container in order to facilitate rapid discharge of the contents of the container.

11 Claims, 15 Drawing Figures

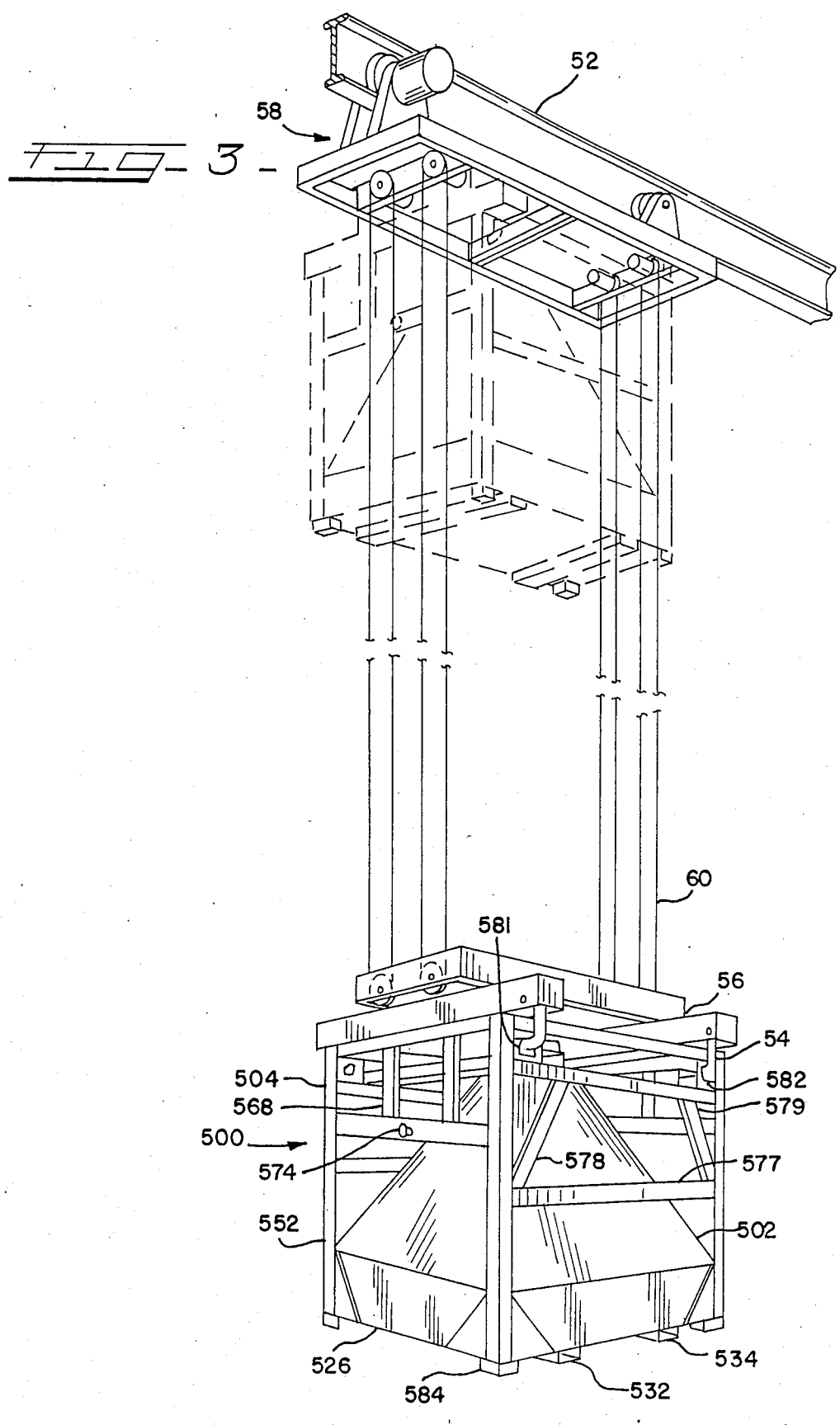

FIG_5
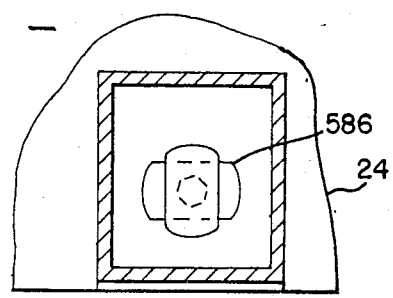
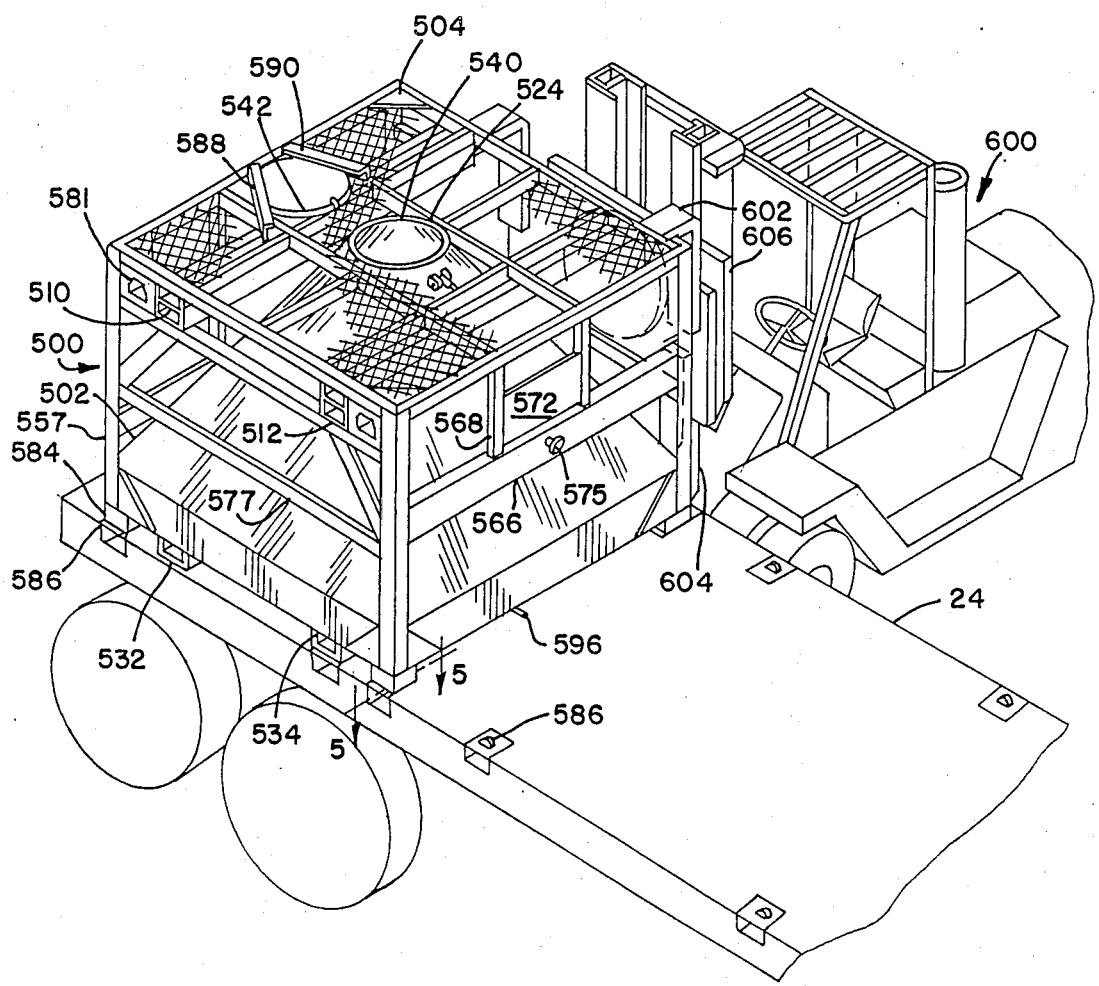
FIG_4

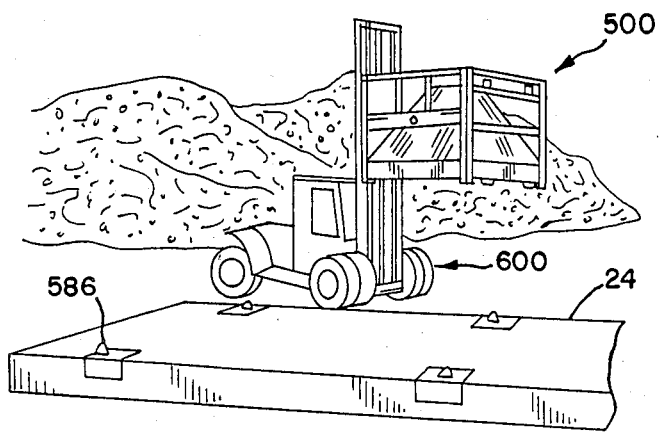
FIG_6_
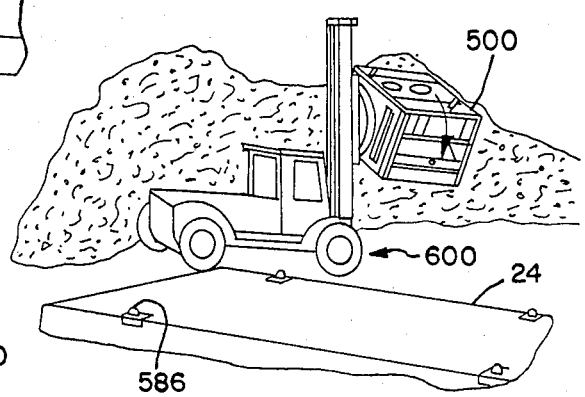
FIG_7_
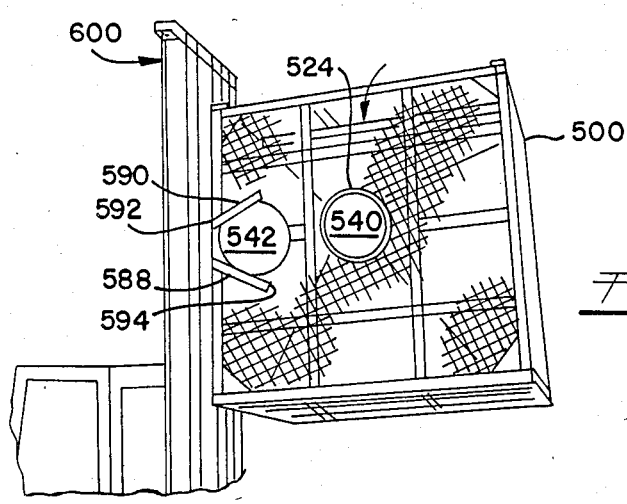
FIG_8_
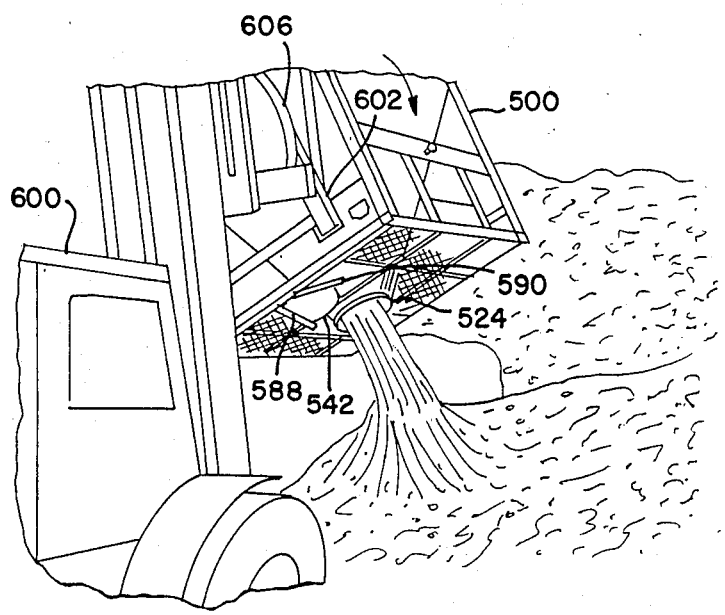
FIG_9_

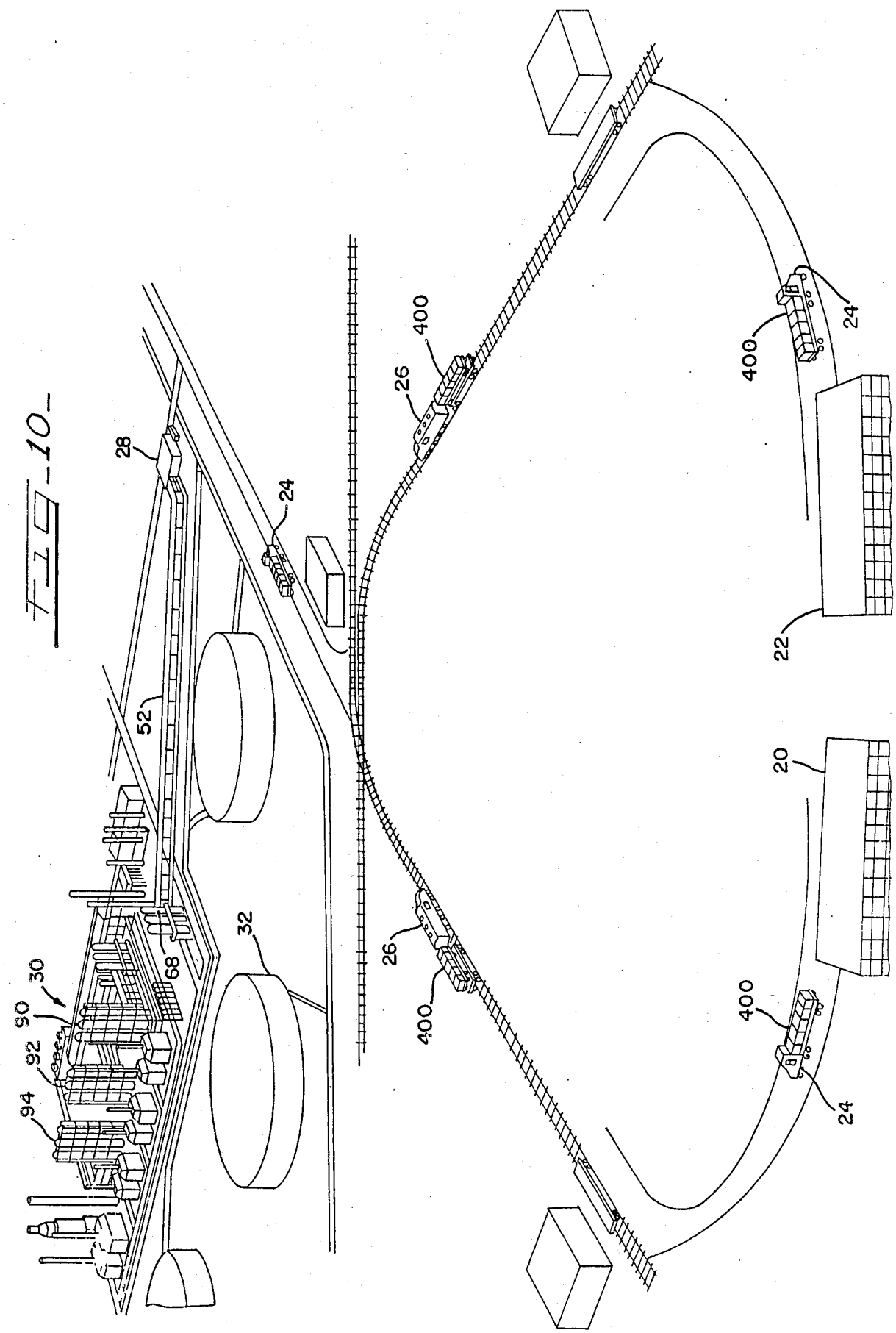

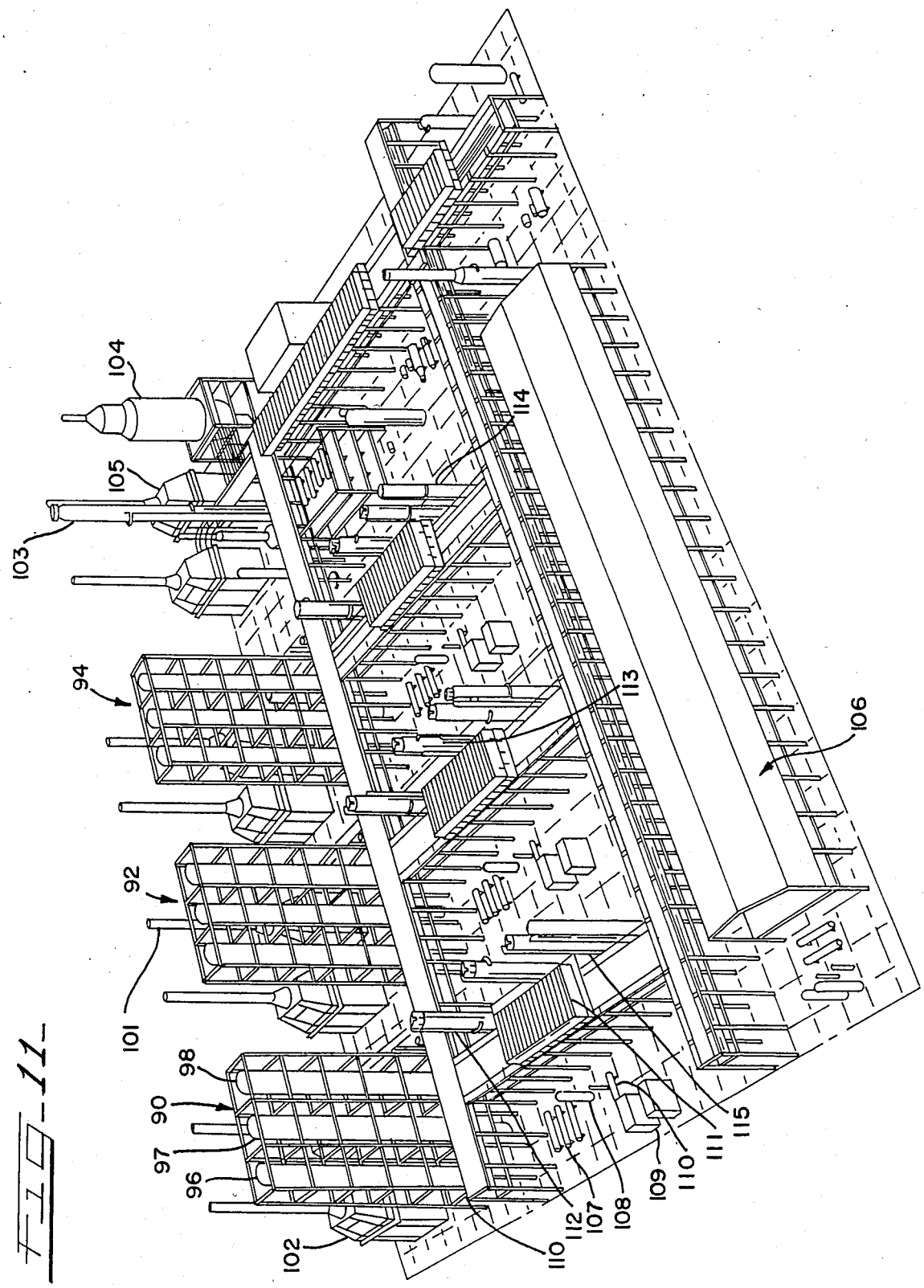

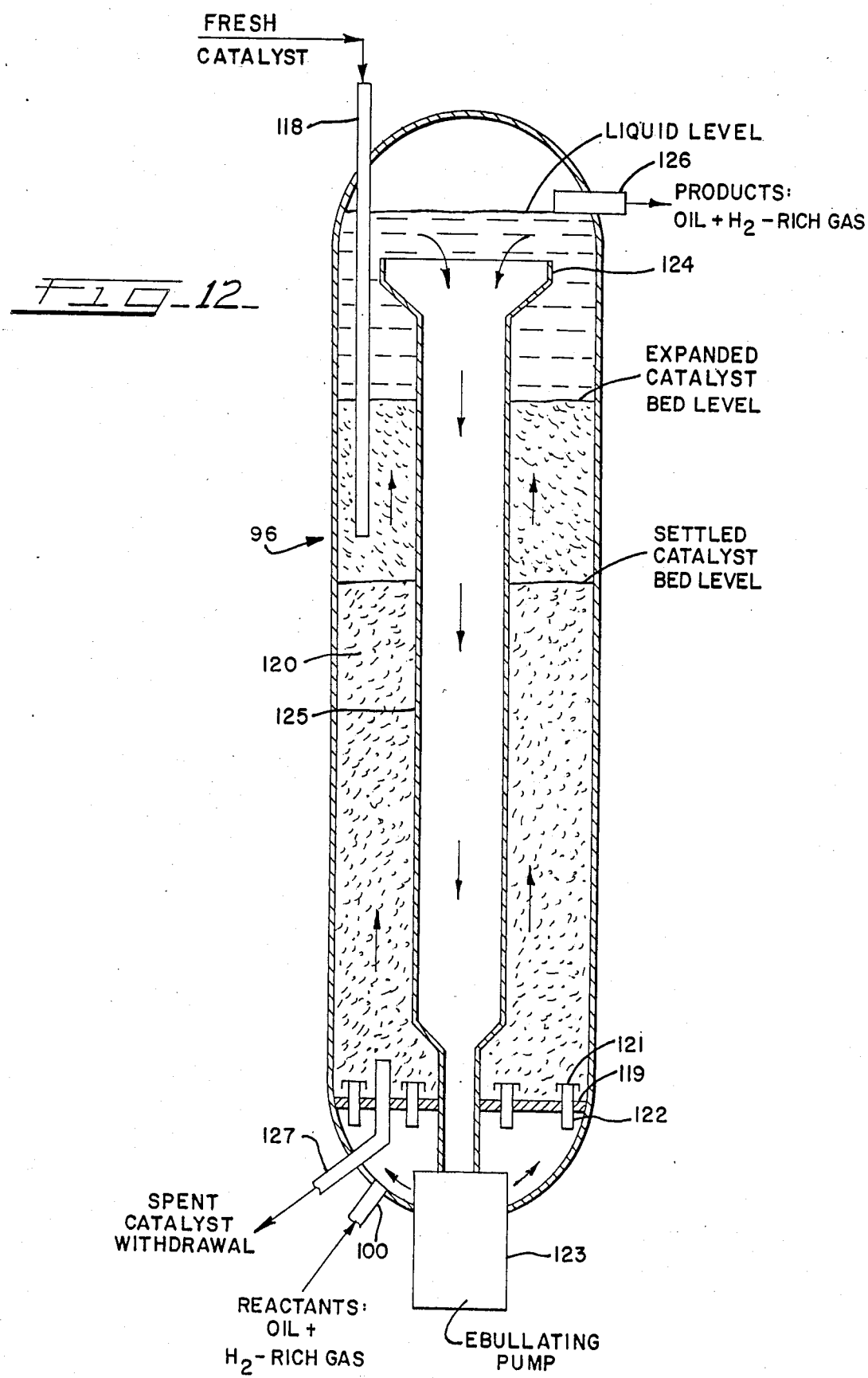

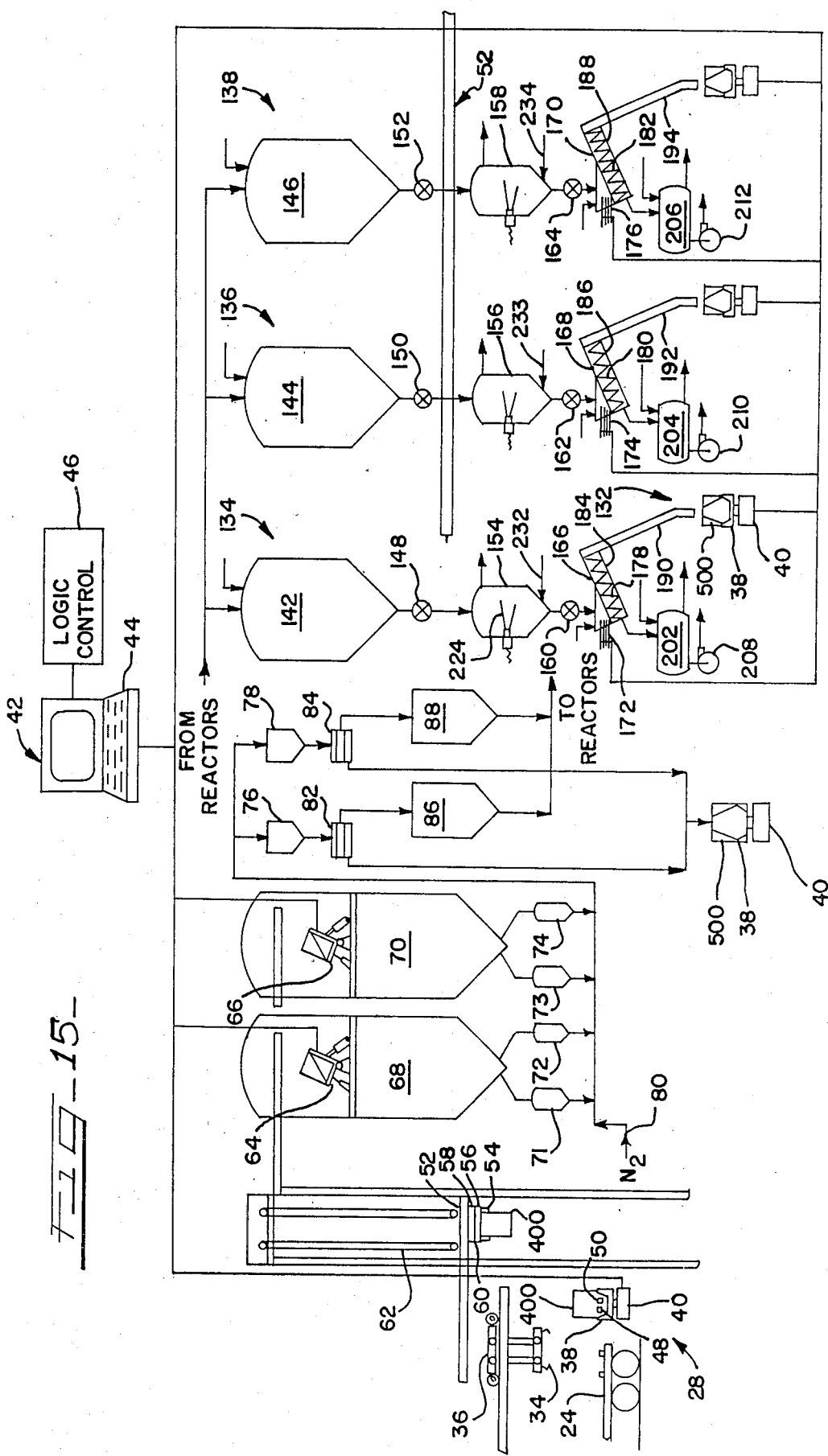

12,662,669

SPENT CATALYST CONTAINER

BACKGROUND OF THE INVENTION

This invention relates to materials handling devices, and more particularly to containers for transporting and storing spent catalyst from a resid hydro-treater.

Spiraling oil costs, extensive price fluctuations, and artificial output limitations by the cartel of oil producing countries (OPEC) have created instability and uncertainty for net oil consuming countries, such as the United States, to attain adequate supplies of high quality, low-sulfur, petroleum crude oil (sweet crude) from Saudi Arabia, Nigeria, and other countries, at reasonable prices for conversion into gasoline, fuel oil, and petrochemical feedstocks. In an effort to stabilize the supply and availability of crude oil at reasonable prices, Amoco Oil Company has developed, constructed, and commercialized within the past year extensive, multi-million dollar refinery projects under the Second Crude Replacement Program (CRP II) to process poorer quality, high-sulfur, petroleum crude oil (sour crude) and demetallate, desulfurize, and hydrocrack resid, to produce high value products, such as gasoline, distillates, catalytic cracker feed, coke, and petroleum petrochemical feedstocks. The Crude Replacement Program is of great benefit to the oil consuming nations by providing for the availability of adequate supplies of gasoline and other petroleum products at reasonable prices while protecting downstream operations of oil refining companies.

Amoco Oil Company's Crude Replacement Program advantageously utilizes ebullated expanded bed reactors for its resid hydrotreating units (RHU). In ebullated bed reactors, oil and hydrogen flow upward through a fixed amount of catalyst. The oil flows upwardly through the catalst bed at a sufficient velocity to expand and maintain the catalyst in a state of random ebullated motion. Ebullated bed reactors were selected over fixed bed reactors because of the ebullated bed reactor's ability to economically process more types of feedstocks as well as their ability to readily adapt to changes in the feedstocks' composition. Ebullated bed reactors desirably accommodate the addition and withdrawal of catalyst onstream during regular use and operation without shutting down the unit. They also minimize bed plugging.

The successful commercialization and use of ebullated bed reactors requires voluminous amounts of catalyst to be transported to and removed from the ebullated bed reactors daily. It also requires that used spent catalyst be deoiled before being shipped to a reclamation site or disposal area to protect the environment by preventing oil from dripping, spilling, and accumulating on the nation's highways, as well as to maximize product yield. In order to safeguard and protect the reactors and associated refinery equipment, it is desirable to restrict trucks from driving anywhere close to the reactors and associated equipment. All of the above requirements create an enormous materials handling problem.

Over the years, a variety of receptacles, drums, containers, bins, cans, boxes, dispensers, and associated equipment, have been suggested for transporting, storing, and dispensing bulk materials, such as dry solids or liquids. These receptacles usually have one or more significant customized features to accommodate the specific material stored in the receptacle and/or to accommodate handling by special types of materials handling equipment. Typifying these prior art receptacles and associated equipment are those found in U.S. Pat. Nos. 1,285,074, 2,035,838, 2,161,988, 2,228,435, 2,293,160, 2,614,817, 2,681,746, 2,862,645, 2,929,658, 3,083,879, 3,111,242, 3,138,297, 3,162,330, 3,182,750, 3,198,395, 3,220,612, 3,224,653, 3,231,141, 3,318,486, 3,347,971, 3,407,971, 3,602,400, 3,785,534, 3,899,095, 4,027,787, 4,032,048, 4,281,729, and 4,474,507. These receptacles and associated equipment have met with varying degrees of success.

It is, therefore, desirable to provide an improved container for handling spent catalyst which overcomes most, if not all, of the above problems.

SUMMARY OF THE INVENTION

An improved spent catalyst container is provided to safely, efficiently, and effectively transport used spent catalyst, such as from a resid hydrotreating unit to a catalyst reclamation site or disposal area. The spent catalyst container is constructed and arranged to protect and safeguard the environment by preventing spent catalyst and reactor oil from the resid hydrotreating unit from spilling, leaking, and accumulating on state and local highways during transport.

To this end, the spent catalyst container has an invertible, rotatable truncated vessel constructed of an oil-impervious catalytically-resistant material. The vessel has an enlarged base which provides the bottom and a smaller top. Sloping sidewalls generally converge towards the top. The top has a mouth which provides the only opening in the vessel for ingress and egress of oil and spent catalyst.

A plurality of forklift channels are operatively connected to the vessel to receive the tines of a forklift truck so as to permit the vessel to be inverted from an upright position for ingress of oil and spent catalyst into the vessel to an inverted position for egress of oil and spent catalyst from the vessel.

Preferably, the vessel has monorail- and bridge crane-grab channels to receive the grab hooks of both a monorail and a bridge crane. Trunnions can be operatively secured to the vessel to receive grasping hooks extending downwardly from spanner bars of an overhead crane to accommodate manual inversion of the vessel.

In the preferred form, a cover is provided to close the opening and biasing mechanisms, such as spring-loaded toggles, are provided to releasably attach the cover to the top. A wedge assembly, preferably in the form of diverging lid-retention guide rails, are operatively associated with the vessel to wedgingly secure the cover to the vessel when the cover is detached from the opening and the vessel is inverted.

In the preferred embodiment, the vessel is surrounded and supported by a support frame to enhance the structural strength and integrity of the vessel. Desirably, the support frame includes a wire mesh-grid support platform about the top to provide access and support of personnel around the top of the container.

A more detailed explanation of the invention is provided in the following description and appended claims taken in conjunction with the accompanying drawings.

BRIEF DESCRIPTION OF THE DRAWINGS

FIG. 3 is a perspective view of the spent catalyst container being lifted by portions of a monorail system and showing in solid line the container in its lowered position and in dotted line the container in its raised position;

FIG. 4 is a perspective view of the container on a flatbed truck trailer;

FIG. 5 is a cross-sectional top view of a portolock locking mechanism;

FIGS. 6–9 are perspective views of the spent catalyst container being sequentially removed from a flatbed truck and rotatably inverted to discharge the spent catalyst and oil from the container into a pile at a reclamation site;

FIG. 10 is a perspective view of a catalyst handling system for transporting fresh and spent catalyst containers to and from resid hydrotreating units at a refinery;

FIG. 11 is a perspective view of the resid hydrotreating unit and associated equipment;

FIG. 12 is a cross-sectional view of an ebullated bed reactor;

FIG. 15 is a schematic flow diagram of portions of the catalyst handling system.

DETAILED DESCRIPTION OF THE PREFERRED EMBODIMENT

A spent catalyst container and receptacle assembly 500 is provided to safely and effectively transport, store, and dispense used spent catalyst from a resid hydrotreating unit to a reclamation site or other disposal area. The spent catalyst container is rotatable from a normally upright input position when transporting, storing, and filling the container with spent hydrotreating catalyst and residual reactor oil from the resid hydrotreating unit to an inverted upside-down discharge position when discharging the spent catalyst and the residual reactor oil from the container at the catalyst reclamation site or disposal area, and vice versa.

Figure 1:
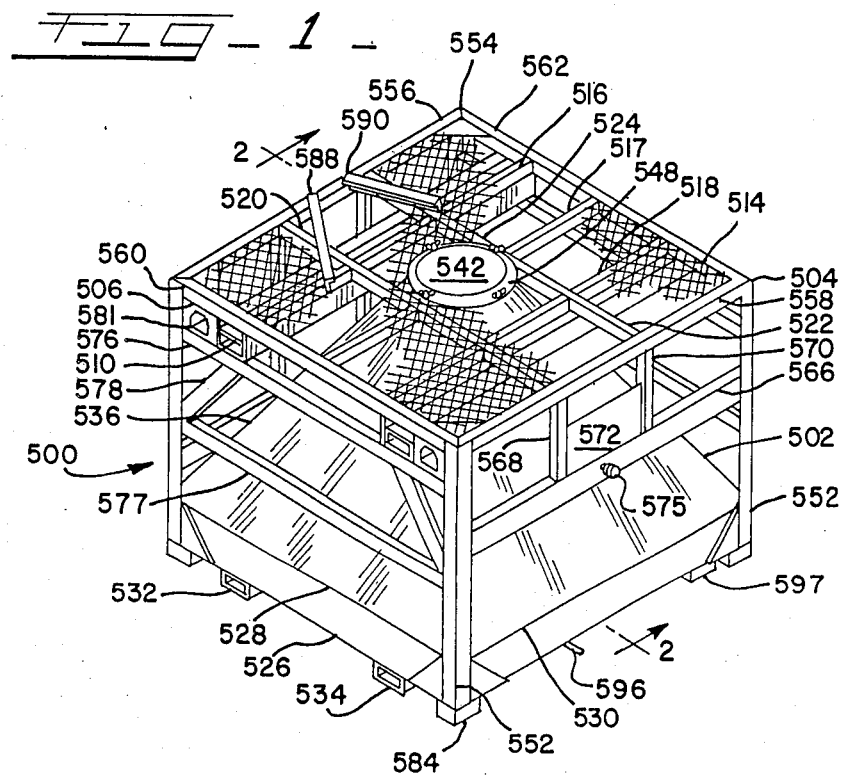
FIG. 1 is a perspective view of a spent catalyst container in accordance with principles of the present invention.
Figure 2:
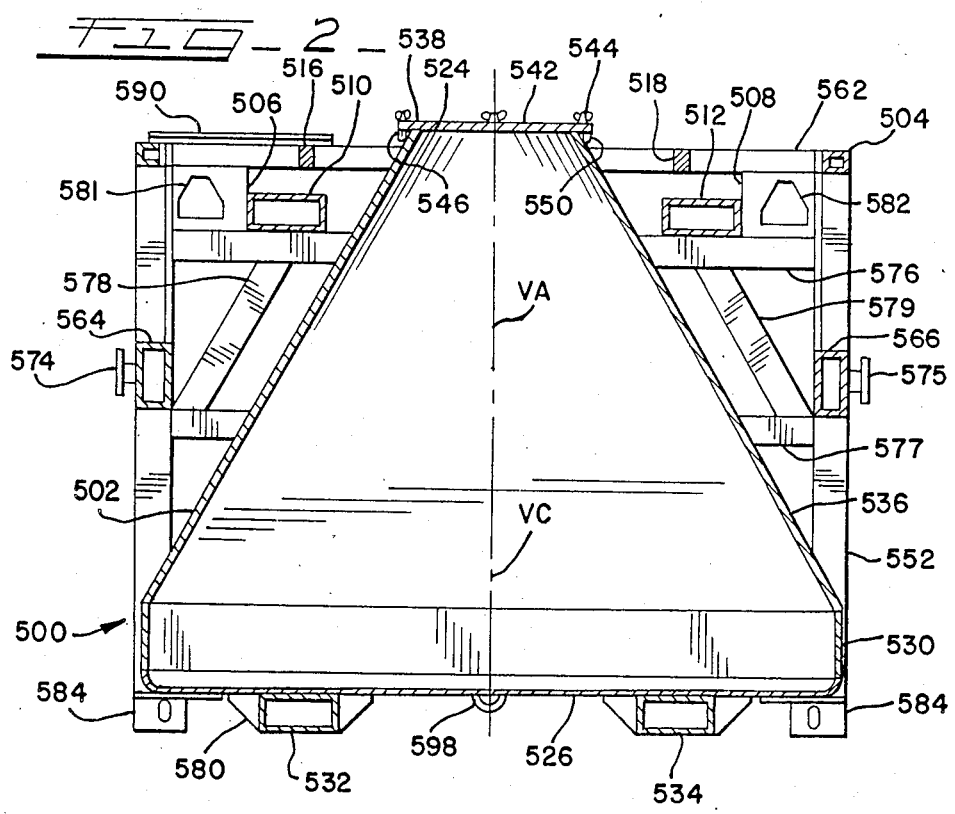
FIG. 2 is a cross-sectional front view of the spent catalyst container.

As shown in FIGS. 1 and 2, the spent catalyst container comprises a truncated, frusto-conical vessel or frustrum-shaped bin 502 which is annularly surrounded, interconnected, and supported by a rectangular frame assembly 504. The frame assembly enhances the structural strength and integrity of the bin and serves as the framework and interface to support the upper forklift channels 510 and 512 (FIG. 2) and the monorail- and bridge crane-receiving slotted wall portions 506 and 508. The frame also includes a rectangular, planar, or flat, wire mesh-grid 514 (FIG. 1) support platform, comprising an expanded metal grating, which is supported and seated upon a matrix of interconnected longitudinal and lateral horizontal bars 516–518 and beams 520 and 522 about the top 524 of the bin for providing access and support of personnel about the top of the bin.

The bin has a planar or flat rectangular base or bottom 526 and a circular top 524 that is substantially smaller than the base. The top and the base are parallel and normally horizontal. Upright wear plates 528 and 530 provide side walls which extend vertically upwardly from the rectangular base to further enhance the structural strength and integrity of the bin as well as to provide an auxiliary barrier and protection shield about the lower forklift channels 532 and 534 to minimize accidental damage from tines of the forklift trucks. In the illustrative embodiment, each of the wear plates and side walls has a rectangular shape. Collectively, the wear plates have a rectangular cross-section as viewed from the top and include parallel longitudinal wear plates 528 and parallel lateral wear plates 530 which extend between and connect the longitudinal wear plates. Elongated truncated, frusto-conical or frustrum-shaped walls or sides 536 extend upwardly at an inward acute angle of inclination from 45° to 75°, and preferably 60°, from the wear plates to the top. The frusto-conical walls have a rectangular cross-section as viewed from the top. It has been found that the 60° angle of inclination of the frusto-conical walls (sides) provide unexpected surprisingly good results for enhancing the efficiency and flow rate of spent catalyst and reactor oil into and out of the spent catalyst container.

The bin is fabricated of rigid oil-impermeable catalytically-resistant, solid impervious metal, such as carbon steel. An annular gasket and seal 538 (FIG. 2) can be positioned coaxially about the top. The bin has a volumetric center VC (FIG. 2) and is symmetric about its vertical axis VA. The top has a horizontal port or mouth 540 (FIGS. 4 and 8) which provides an access opening and discharge hole for input and discharge of reactor oil and spent catalyst into and out of the bin. The access opening provides the only opening in the vessel. The positioning of the only opening at the top of the container in cooperation with the special shape of the bin, the annular seal and other features of the container effectively prevent the spent catalyst and residual reactor oil content within the container from leaking or spilling upon roads and highways. A removable circular lid 542 detachably closes and seals the opening. Wingnut swing bolts 544 (FIG. 2) or other fasteners detachably connect the lid 542 to bolt-mountings 546 or an annular flange 548 (FIG. 1) about the top. Alternatively or in addition thereto, spring-loaded toggles 550 (FIG. 2) can be provided to detachably connect the lid to toggle-receiving members of the angular flange or support platform.

In one example, the spent catalyst bins which have been constructed and successfully used in commercial operations within the past year at the Amoco Oil Company Refinery in Texas City, TX, had an 8 foot square base, a 2 foot diameter access opening, a height slightly less than 7 feet, and an interior volume of 125 cubic feet. The interior volume of the spent catalyst containers are about ½ of the volume of fresh catalyst containers since the spent catalyst and residual reactor oil loaded in the spent catalyst container at the spent and deoiling filling station weigh about twice as much as an equivalent amount of unused fresh catalyst.

The frame assembly 504 (FIG. 1) has vertical posts 552 extending upwardly from each corner of the rectangular base 526 to about the height of the top of the bin. A rectangular horizontal peripheral support assembly 554 comprising parallel longitudinal L-shaped, support rails or beams 556 and 558 and parallel lateral L-shaped, support rails or beams 560 and 562 extending between and connecting the longitudinal rails, are welded or otherwise secured to the top of the posts. The top support assembly 554 has a rectangular shape as viewed from above the top of the bin. The support rails serve to support and reinforce the posts. The support rails also serve to support the periphery of the wire mesh-grid support platform 514. Longitudinal support beams 564 and 566 (FIG. 2) extend longitudinally between and connect the posts above the height of the volumetric center of the bin along the longitudinal sides of the frame assembly. Parallel vertical bars 568 and 570 (FIG. 1) extend between and connect a longitudinal beam 566 or 564 to the top longitudinal support rails 558 or 556. The vertical bars are positioned symmetrically about the volumetric center and serve as additional support for the top longitudinal support rails.

A flat or planar metal display sign 572 (FIG. 1) can be positioned between one of the pairs of vertical bars and is preferably welded to the bottom of the vertical bars along the top center portion of the longitudinal beam. The display sign can have an S-shaped opening or other indicia thereon to identify the spent catalyst container and/or designate the orientation of the bin in the south position.

Trunnions 574 and 575 (FIGS. 1 and 2) extend laterally outwardly from the center of the longitudinal beams to facilitate manual auxiliary, spanner (spreader) bar-rotation of the bin from a normally upright position to an inverted upside-down position to accommodate manual discharge of the contents in the bin.

Upper lateral support beams 576 (FIG. 2) extend laterally between and connect the posts at a position spaced below but in proximity to the top to support the upper forklift channels 510 and 512 and grab-hook channels 506 and 508. Intermediate parallel lateral beams 577 extend laterally between and connect the center portions of the posts at a position below the trunnions. The intermediate beams provide additional support for the frame assembly. Diagonal braces 578 and 579 extend upwardly and inwardly at an acute angle from the top end portions of the intermediate beams adjacent the posts to the bottom portions of the upper lateral beam 576 below the upper forklift channels for additional support. In the illustrative embodiment the diagonal braces are positioned at about the same 60° angle of inclination as the inclined frusto-conical walls 536 of the bin.

Upper parallel forklift channels 510 and 512 (FIG. 2) are mounted above the upper portions of the diagonal braces 578 and 579 along the upper surfaces of the upper lateral beams 576. The forklift channels extend longitudinally across and are connected and seated upon the upper lateral beams. The upper forklift channels comprise rectangular steel tubes or tubular beams with a rectangular cross-section. The upper forklift channels receive the upper tines of a rotatable forklift truck. Lower parallel forklift channels 532 and 534 are mounted along the underside of the base of the bin. The lower forklift channels extend downwardly from the base 526 and longitudinally across the base. The lower forklift channels are positioned closer together than the upper forklift channels for enhancing inversion of the container as well as to minimize stresses on the container during rotation of the container due to shifting of the container's center of gravity. Preferably the lower forklift channels are of the same size, shape, and construction as the upper forklift channels. The lower forklift channels comprise rectangular steel tubes or tubular beams with a rectangular cross-section. The lower forklift channels receive the lower tines of a rotatable forklift truck. The upper and lower forklift channels cooperate with each other and the tines of the forklift truck 600 (FIGS. 4 and 6-9) to facilitate rotation of the bin from a normally upright input position when transporting, storing, and filling the bin with spent catalyst and residual reactor oil from the resid hydrotreating unit to an inverted upside-down discharge position when discharging spent catalyst and residual reactor oil from the bin at the reclamation site or disposal area and vice versa.

In the preferred embodiment, the forklift truck 600 (FIGS. 4 and 6-9) has a pair of upper tines 602 (Figure 4) and a pair of lower tines 604 which extend forwardly and are cantilevered from a motor driven rotator 606. The tines or forks are parallel, normally horizontal, and in registration with each other. The upper and lower tines matingly engage and fit into the upper and lower forklift channels of the spent catalyst bin. Since the spent catalyst container is symmetrical about its vertical axis, the tines can be inserted into either the front or back open ends of the upper and lower forklift channels. When the tines are properly inserted into the forklift channels, the forklift can raise and lower the spent catalyst container onto and off of a flatbed truck, support, move, and carry the container, and rotate the container from an upright filling, transport, and storage position to an upside-down inverted dumping position and vice versa by rotating the tines via the rotator.

Triangular reinforcing wear plates or gussets 580 (FIG. 2) can be mounted to the upright sides of the lower forklift channels and to the underside of the base adjacent the exterior surface of the bin to reinforce and support the lower forklift channels and to provide a protection barrier to minimize accidental damage by the lower tines of a forklift truck.

Rectangular grab-hook channel plates 506 and 508 (FIG. 2) are mounted laterally between the upper forklift channels 510 and 512 and the posts and extend vertically between the upper lateral beams 576 and the top lateral support rails 560 and 562 (FIGS. 1 and 2). These plates provide lateral wall portions and have generally pentagon-shaped monorail- and bridge crane-receiving slots or openings 581 and 582 to alternatively receive the grab hooks 54 (FIG. 3) of a monorail transport carrier 56 of an overhead monorail trolley 58 and the grab hooks 34 (FIG. 15) of a bridge crane 36 to facilitate transport by both a monorail 52 and a bridge crane 36.

Portolock castings or legs 584 (FIGS. 1 and 2) extend downwardly from the corners of the base of the bin below the posts to matingly engage and lockably receive retractable or pivotable portolock pins 586 (FIG. 4) of a flatbed truck trailer 24 in order to secure the spent catalyst container to the flatbed truck trailer during transport by truck.

The frame assembly 504 (FIG. 1) also includes intermediate top rails 516-518, 520 and 522 which extend longitudinal and laterally between the rectangular peripheral support rails 556, 558, 560 and 562 about the opening of the top to support the rectangular wire meshed-grid support platform 514. The wire meshed-grid support platform provides access and support of personnel about the top of the bin.

Lid-retention guide rails 588 and 590 (FIGS. 1, 4 and 8) can be mounted upon the support platform either laterally or longitudinally of the top opening. In the illustrative embodiment, the guide rails are L-shaped and straight. The rails are positioned at an acute angle of inclination relative to each other and have converging ends 592 (FIG. 8) and diverging ends 594. The diverging ends are spaced apart from each other and span a distance substantially greater than the diameter of the circular lid 542 to provide an access mouth or opening for entering and removing the lid from the lid-retention guide rails. The converging ends are spaced apart from each other and span a distance substantially less than the diameter of the lid so that the lid can be snugly held, securely engaged, and wedged by the lid-retention guide rails when the lid is inserted and wedged between the guide rails through the access mouth. Preferably, the guide rails diverge generally in the direction of and are symmetrically positioned about the opening 540 in the top of the bin. The guide rails cooperate with each other to firmly hold the lid when the lid has been detached from the opening and the bin is rotated to an inverted upside-down discharge position. One or more wing-nut swing bolts can also be provided to fasten the lid to the guide rails.

In the preferred embodiment, the bin, frame assembly, and most other parts of the spent catalyst container are constructed of carbon steel. During transport and storage the longitudinal and lateral beams and rails, as well as the forklift channels, are normally horizontal.

The spent catalyst container can also have high and low level indicators operatively connected thereto. The spent catalyst container can further have a spent catalyst indicating-pin 596 (FIG. 1) extending outwardly from the bin or a downwardly extending block 597 in proximity to the base to engage and trip limit switches mounted upon the interface board of the intelligence pads at the spent catalyst filling station and at the staging area, to electronically indicate, along with the weight scales, to the central processing unit and operator that the container is a spent catalyst container and is either empty or fully or partially loaded with spent catalyst. A U-shaped inverting loop 598 (FIG. 2) can extend downwardly from the base along the vertical axis of the bin and adjacent the front of the bin to further accommodate manual inversion of the bin, such as with spanner barcrane, if desired.

In operation, as shown in FIG. 10, fresh hydrotreating catalyst is loaded in fresh catalyst containers, bins, or vessels 400 at a catalyst manufacturing facility 20 or supply house 22 and transported by flatbed truck 24 and railroad 26 to a staging area complex facility and warehouse 28 of an oil refinery 30 surrounded by aboveground tanks 32. The fresh catalyst containers are unloaded and removed from the flatbed trucks at the staging area facility by grab hooks 34 (FIG. 15) of a mobile bridge crane 36 and placed on an intelligence pad 38 where it is weighed by a weight scale 40 that is operatively connected to a central processing unit 42 comprising a computer 44 and a logic control board 46. The weight scale and central processing unit cooperate and interface with each other to determine whether the containers are empty or partially or fully filled with fresh or spent catalyst. A catalyst indicating pin 48 extending from the base of the fresh catalyst container engages a limit switch 50 on the intelligence pad, which is also operatively connected to the central processing unit, to electronically detect the type of catalyst contained in the fresh catalyst bin.

The fresh catalyst bin is then lifted off the intelligence pad and raised to the underside of an overhead monorail 52 (FIG. 15) by the grab hooks 54 of a monorail transport carrier 56. The monorail transport carrier is operatively connected to the monorail trolley 58 by cable 60. The trolley and the grab hooks are operatively connected to the central processing unit and are remotely and automatically controlled. The trolley and grab hooks also have manual override safety controls.

Each fresh catalyst container is carried by the overhead monorail from the staging area facility to a remote control, computerized lift elevator 62. The lift elevator raises the fresh catalyst container to a tilting mechanism and discharge assembly 64 or 66 where the fresh catalyst contents of the bin are dumped into one of two fresh catalyst silos 68 or 70 depending on the type (composition) of the catalyst. The empty fresh catalyst containers are returned to the staging area, catalyst vendors, and suppliers by reversing the above procedure.

The fresh catalyst is pneumatically conveyed from the silo through pneumatic transfer vessels 71-74 to a surge hopper 76 or 78 with nitrogen gas from nitrogen gas injectors 80. Smaller particles of the fresh catalyst are removed by vibrating screens 82 or 84. The removed smaller particles are carried by nitrogen gas through a horizontal air slide to a vertical chute and loaded into spent catalyst containers 500 on intelligence pads 38, positioned on weight scales 40, and transported to the staging area and reclamation site in a manner similar to the spent catalyst containers loaded with deoiled spent catalyst. Larger particles of fresh catalyst are passed to a storage hopper 86 or 88 from which they are fluidly conveyed to the reactors of a resid hydrotreating unit (RHU) by a heavy vacuum gas oil slurry.

As best shown in FIG. 11, each resid hydrotreating unit 90, 92 and 94 is a reactor train comprising a cascaded series or set of three ebullated bed reactors 96, 97 and 98. Hydrogen is injected into the ebullated bed reactors through feed line 100. A relatively high sulfur resid or sour crude is fed into the reactor where it is hydroprocessed (hydrotreated) and ebullated in the presence of the fresh and/or equilibrium catalyst and hydrogen to produce an upgraded effluent product stream leaving spent catalyst. As used throughout this patent application, the term "equilibrium catalyst" means a fresh catalyst which has been partially or fully used. The term "spent catalyst" as used in this patent application comprises equilibrium catalyst which has been withdrawn from a reactor. Hydroprocessing in the RHU includes demetallation, desulfurization, and hydrocracking. Hydroprocessing can convert most of the feedstock to lighter more valuable products, such as gasoline, distillates, catalytic cracker feed, and petrochemical feedstocks. The remaining portion of the products can be charged to cokers.

The resid hydrotreating units and associated refining equipment of FIG. 11 comprise three identical parallel trains of cascaded ebullated bed reactors 90, 92 and 94, as well as hydrogen heaters 101, influent oil heaters 102, an atmospheric tower 103, a vacuum tower 104, a vacuum tower oil heater 105, a hydrogen compression area 106, oil preheater exchangers 107, separators 108, recycled gas compressors 109, flash drums 110, separators 111, raw oil surge drums 112, sponge oil flash drums 113, amine absorbers and recycle gas suction drums 114, and sponge absorbers and separators 115.

Each of the reactor trains comprises three ebullated bed reactors in a series. The feed typically comprises resid. Recycled gas can also be injected into the reactors along with the hydrogen gas. Demetallation primarily occurs in the first ebullated bed reactor in each train. Desulfurization primarily occurs in the second and the third ebullated bed reactors in each train. The effluent product stream typically comprises light hydrocarbon gases, hydrotreated naphtha, distillates, light and heavy gas oil, and unconverted resid. The hydrotreating catalyst typically comprises a hydrogenating component on a porous refractory, inorganic oxide support. A cobalt molybdenum catalyst is preferably ers are returned to the deoiling and spent catalyst filling station by reversing the above procedure.

In order to increase product yield and prevent residual reactor oil from spilling and dripping from the spent catalyst containers onto the nation's highways, the spent catalyst is substantially deoiled before being loaded into the spent catalyst containers. To this end, special deoiling equipment 134, 136 and 138 (FIG. 15) comprising a deoiling system is operatively connected and positioned downstream of the resid hydrotreating units 90, 92 and 94 (FIGS. 10 and 11). The deoiling equipment includes a high pressure transfer vessel, spent catalyst inventory vessels 142, 144 and 146 (FIG. 15), inventory flows valves 148, 150 and 152, cooling drums or vessels 154, 156 and 158, cooling drum-outlet valves 160, 162 and 164, spiral classifiers 166, 168 and 170 having inlet feedhoppers 172, 174 and 176 and screw conveyors 178, 180 and 182 positioned at an incline within screw-conveyor housing-sections 184, 186 and 188, swingable (pivotable) spiral discharge chutes 190, 192 and 194 pivotally connected to the top of the housing-sections of the spiral classifiers, intelligence pads 38 with upright guide posts for holding spent catalyst containers, weigh scales 40 at the bottom of the intelligence pads operatively connected to the logic control board 46 and computer 44 of the central processing unit 42, a watercooled heat exchanger or water cooler, a watercooler-inlet valve, a cooling drum inlet valve, one or more surge drums 202, 204 and 206 (FIG. 15), recycle centrifugal pumps 208, 210 and 212 and various interconnecting transfer lines, pipes, and conduits. The watercooler 196 can also be connected and communicate with the inlet feed line 220 through line 213 to cool the slurry of mid-distillate diesel oil and spent catalyst to a desired temperature below the flash point of the diesel oil before the diesel oil enters the inventory silo 142. A motor rotatably drives the screw conveyors of the spiral classifiers.

The first reactor 96 (FIG. 13) is operatively associated with and connected to the deoiling equipment, as well as to a pair of intelligence pads 38 (FIG. 15). The second and third reactors 97 and 98 are each operatively associated and connected to similar deoiling equipment such as those shown downstream of vessels 144 and 146, respectively (FIG. 15).

In the deoiling process, a slurry of spent catalyst and effluent reactor oil is withdrawn from the ebullated bed reactors and fed through a spent catalyst slurry line to the high-pressure catalyst-transfer vessel where it is cooled to a temperature above the 165° F. flashpoint of mid-distillate diesel oil, preferably to about 180° F. The cooled slurry is withdrawn from the transfer vessel through a discharge line and conveyed with some mid-distillate diesel oil to the spent catalyst inventory vessel 142 (FIG. 15). The slurry is withdrawn from the inventory vessel 142 and gravitated to the cooling drum 154 via control valve 148. Positioned within the interior of the cooling drum is a vibrating tuning fork probe 224 which is operatively connected to the central processing unit. The vibrating tuning fork probe electronically detects the presence or absence of spent catalyst and controls the amount of spent catalyst in the cooling drum. When the amount of spent catalyst sensed by the vibrating tuning fork probe has reached a preselected level, the flow of slurry from the inventory vessel 142 into the cooling drum 154 is blocked and stopped by control valve 148 operatively connected to the vibrating tuning fork probe and the central processing unit.

The tuning fork probes and the cooling drum also serve as safety controls to electronically close their associated cooling drum valve when about 250 cubic feet of catalyst slurry has filled the cooling drum to avoid overloading and damaging the spiral classifier.

The slurry of catalyst and oil in the cooling drum 154 (FIG. 15) is cooled to a temperature below the flashpoint of the mid-distillate diesel oil, preferably to about 130° F. The cooling of the slurry is accomplished in the cooling drum by circulating and pumping a cooling oil comprising cooled mid-distillate diesel oil from oil lines 232–234 in direct heat exchange contact with the slurry in the cooling drum. The effluent cooling oil is withdrawn from the cooling drum through effluent oil lines and circulated through the watercooled heat exchanger where the effluent cooling oil is cooled. The cooled effluent oil is passed from the heat exchanger to the spent catalyst surge drum 202.

The cooled slurry from the cooling drum 154 (FIG. 15) is conveyed by gravity flow to the feedhopper 172 of the spiral classifier 166. The cooled slurry is spirally conveyed from the feedhopper with the rotating screw conveyor blades 178 of the spiral classifier at an upward angle of inclination ranging from 15° to 60°. As this occurs, a substantial amount of the mid-distillate diesel oil from the spent catalyst is removed and drained to substantially deoil the spent catalyst. The removed oil is conveyed by gravity flow at a downward angle of inclination, generally opposite the angle of inclination of the screw conveyor 178, through the clearance around the circumference of the screw conveyor blades 178 along with bottom interior surface of the screw-conveyor housing-section 184. The removed oil flows in a general countercurrent flow relationship to the upwardly conveyed catalyst slurry.

Preferably, the feedhoppers 172, 174 and 176 (FIG. 15) are blanketed with nitrogen to remove hydrocarbon gases so as to enhance operator safety. A nitrogen purge can be injected into the inventory vessels 142, 143 and 144 to attain the desired pressure and help prevent oxygen from entering the inventory vessel 142.

The flow of deoiled catalyst is directed and dispensed at a downward angle of inclination by gravity from the top of the spiral classifier 166, 168 or 170 (FIG. 15) through the discharge chute 190, 192 or 194 into the top of a first spent catalyst container 500. The weight of the spent catalyst container is continuously sensed through the weigh scale 40 while the deoiled catalyst is fed into the spent catalyst bin. The weigh scale is operatively connected via the central processing unit to the motor of the spiral classifier and optionally to cooling drum valve 160, 162 or 164. The weigh scale, in cooperation with the central processing unit, de-energizes and stops the motor and optionally activates the flow valve to stop, shut off, and block the flow of deoiled catalyst into the container when the container being loaded with spent catalyst has reached a preselected weight. Thereafter, the discharge chute is pivoted to a position above the second spent catalyst container and the deoiled catalyst is directed and dispensed through the discharge chute into the second spent catalyst container in a similar manner.

As the spent catalyst containers are filled to their desired weights, the tops of the containers are closed with a closure lid or cap. The spent catalyst containers are then grasped and lifted by the grab hooks 54 (FIGS. 3 and 15) of the monorail transport carrier 56 and raised to the trolley 58 of an overhead monorail 52 where they fed to all of the reactors because it promotes demetallation as well as desulfurization.

The resid hydrotreating unit is quite flexible and, if desired, the same catalyst can be fed to one or more reactors or a separate demetallation catalyst can be fed to the first reactor while a desulfurization catalyst can be fed to the second and/or third reactors. Alternatively, different catalysts can be fed to each of the reactors. The used spent catalyst typically contains or is covered with nickel, sulfur, vanadium, and carbon (coke). As much as fifteen tons of catalyst are transported into, out of, and replaced in the ebullated bed reactors daily.

In use, fresh hydrotreating catalyst is fed downwardly into the top of the first ebullated bed reactor 96 (FIG. 12) through the fresh catalyst feed line 118. Hot resid feed and hydrogen enters the bottom of the first ebullated bed reactor 96 (FIG. 12) through feed line 100 and flows upwardly through a distributor plate 119 into the fresh catalyst bed 120. The distributor plate contains numerous bubble caps 121 and risers 122 which help distribute the oil and the gas generally evenly across the reactor. An ebullating pump 123 circulates oil from a recycle pan 124 through a downcomber 125 and the distributor plate 119. The rate is sufficient to lift and expand the catalyst bed from its initial settled level to its steady state expanded level. The effluent product stream of partially hydrotreated oil and hydrogen-rich gases are withdrawn from the top of the reactor through effluent product line 126. The used spent catalyst is withdrawn from the bottom of the reactor through spent catalyst discharge line 127. The spent catalyst typically contains deposits of metals, such as nickel and vanadium, which have been removed from the influent feed oil during hydrotreating.

Catalyst particles are suspended in a two-phase mixture of oil and hydrogen rich gas in the reaction zone of the reactor. Hydrogen gas typically continually bubbles through the oil. The random ebullating motion of the catalyst particle results in a turbulent mixture of the three phases which promotes good contact mixing and minimizes temperature gradients.

The cascading of the ebullated bed reactors in a series of three per reactor train, in which the effluent of one reactor serves as the feed to the next reactor, greatly improves the catalytic performance of the back-mixed ebullated bed process. Increasing the catalyst replacement rate increases the average catalyst activity.

Figure 13:
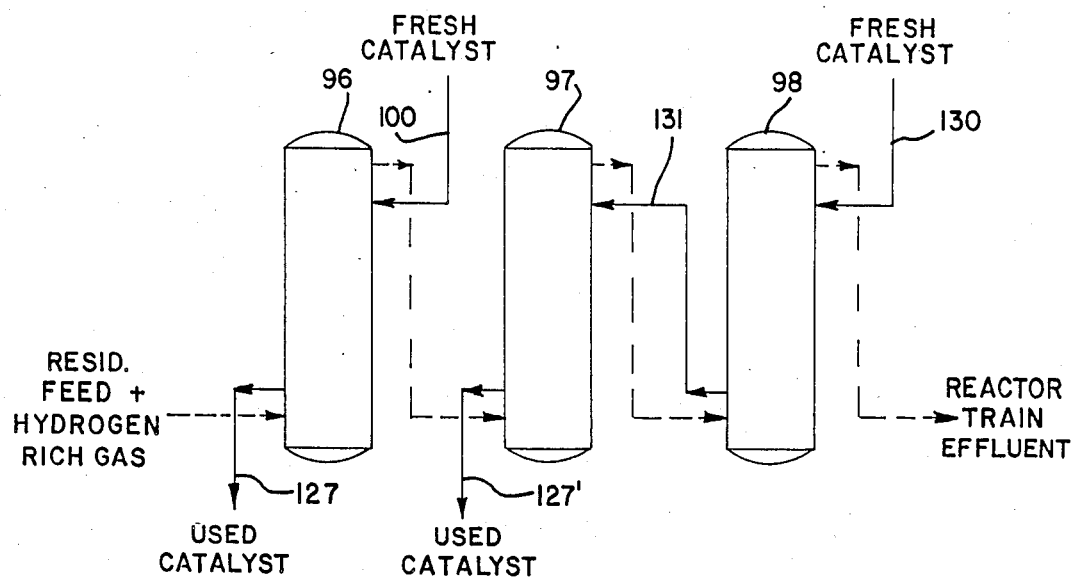
FIGS. 13 and 14 are schematic flow diagrams of a train of reactors.
Figure 14:
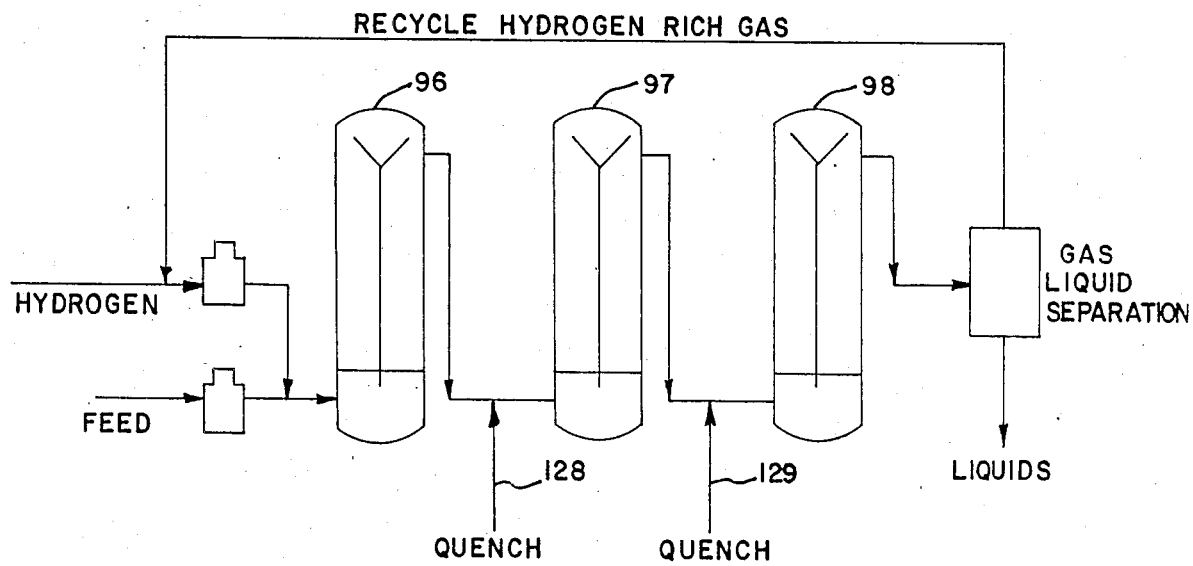

As shown in FIGS. 13 and 14, the partially hydrotreated effluent of the first ebullated bed reactor 96 comprises the influent feed of the second ebullated bed reactor 97. The partially hydrotreated effluent of the second ebullated bed reactor 97 is the influent feed of the third ebullated bed reactor 98. The second and third reactors are functionally, operatively, and structurally similar to the first reactor and cooperate with the first reactor to effectively hydrotreat and upgrade the influent feed oil. Quench liquid (oil) and/or vapor can be injected into the influent feeds of the second and third reactors through quench lines 128 and 129 (FIG. 14) to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 100 and 130 (FIG. 13) and by feeding recycled spent catalyst from the third reactor into the second reactor through recycle catalyst line 131. For best results, the catalyst is fed downwardly into the ebullated bed reactor in countercurrent flow relationship to the influent oil and hydrogen feed. Used spent catalyst are discharged from the reactor through spent catalyst discharge lines 127 and 127'.

Preferably, vacuum resid is heated in the oil heater 102 (FIG. 11) and hydrogen is heated in the hydrogen heater 101 before being combined and fed through the feed line 100 into the first reactor for process efficiency. The effluent product streams can be withdrawn from the bottoms or tops of the reactors, as preferred.

The fluid state of the ebullated hydrotreating catalyst enhances the flexibility of the ebullated bed reactors and permits the addition or withdrawal of oil slurry and catalyst without taking the reactors offstream. Daily catalyst replacement results in a steady state equilibrium catalyst activity.

Products are withdrawn from the bottom or top of the third reactor 98 and are separated into fractions of oil and gas in the towers and other processing equipment previously described.

The ebullated bed reactors are capable of handling atmospheric and vacuum resids from a wide range of sour and/or heavy crudes. Such crudes can have a gravity as much as 20° API, a sulfur content ranging up to 8% by weight, and a substantial amount of nickel and vanadium. The ebullated bed reactors typically operate at a temperature above 700° F. and at a hydrogen partial pressure ranging greater than 1500 PSIA.

Ebullated bed reactors have many advantages over fixed bed reactors. They permit operation at higher average temperatures. They permit the addition and withdrawal of catalyst without necessitating shutdown. They avoid plugging due to dirty feed.

Since the liquid resid feed does not usually have enough velocity to expand the catalyst bed above its settled level, liquid is recycled from the top of the reactor to the bottom of the reactor through a downcomer pipe and then pumped back up through the reactor at a sufficient velocity to attain the required degree of expansion.

The products produced from the resid hydrotreating units in the ebullated bed reactors include light hydrocarbon gases, light naphtha, heavy naphtha, light distillate, mid-distillate diesel oil, light vacuum gas oil, heavy vacuum gas oil, and 1000+° F. resid. The light hydrocarbon gases and light naphtha can be fed into a vapor recovery unit. Heavy naphtha can be sent to a reformer. The mid-distillate oil is useful for producing diesel fuel and furnace oil, as well as for conveying and/or cooling the spent catalyst. Light and heavy vacuum gas oils are useful as feedstock for a catalytic cracker. The 1000° F. can be sent to cokers to produce coke.

After the fresh hydrotreating catalyst has been used to hydrotreat and upgrade the influent feed oil, the spent equilibrium catalyst is removed and loaded into spent catalyst containers, bins, or vessels 500 (FIG. 15) on other intelligence pads 38. The spent catalyst containers are lifted from the intelligence pads at the deoiling station and spent catalyst-loading zone 132 to the spent catalyst return section 134 of the overhead monorail 52 by the grab hooks 54 of the monorail transport carrier 56. The spent catalyst containers are transported, carried, and returned by the overhead monorail to the staging area complex 28 where the containers are loaded onto a flatbed truck and shipped to a reclamation site or disposal facility for reclamation and/or disposal of the spent catalyst. The empty spent catalyst containare transported to the staging area complex facility 28. At the staging area complex facility, the filled spent catalyst containers are loaded onto flatbed truck trailers 24 (FIG. 15) by a bridge crane 36 and transported by flatbed truck to the reclamation site.

At the reclamation site, the driver or other personnel unlatches the portolock pins 586 (FIG. 4) of the flatbed truck 24 from the portolock casting legs 584 of the spent catalyst container, such as with a rod. The lid 542 is removed from the top of the spent catalyst container and securely placed and wedged into the lid-retention guide rails 588 and 590. A forklift truck 600 aligns, positions, and inserts the upper and lower tines 602 and 604 into the upper and lower forklift channels 510 and 512, and 532 and 534, respectively, of the spent catalyst container.

As best shown in FIGS. 6-9, the forklift truck then sequentially lifts and removes the spent catalyst bin from the flatbed truck, moves the spent catalyst container to the discharge dump site and rotates the tines via the motor driven rotator to an upside-down inverted position to empty the spent catalyst and residual reactor oil from the spent catalyst container into a pile. In use, a forklift truck can typically move, rotate, and empty the contents of the spent catalyst container in less than 30 seconds. Afterwards, the forklift truck rotates the tines of their initial position to return the spent catalyst container to its normal rightside-up position. The forklift truck then moves and replaces the spent catalyst container on the flatbed truck for shipment back to the refinery.

The above resid hydrotreating units and spent catalyst containers have been built, constructed, and extensively tested in the Amoco Oil Company Refinery at Texas City, TX. The resid hydrotreating units and spent catalyst containers commenced commercial operations within the past year and produced unexpectedly good results. The resid hydrotreating units have been commercially successful to process and upgrade substantial quantities of sour crude and resid into gasoline and other valuable petroleum products in order to decrease America's dependence on foreign oil from Saudi Arabia, Nigeria, etc. The spent catalyst containers have been commercially successful to efficiently remove and transport spent catalyst to a reclamation site in an environmentally safe manner.

Although embodiments of this invention have been shown and described, it is to be understood that various modifications and substitutions, as well as rearrangements of parts, components, equipment, and/or process steps, can be made by those skilled in the art without departing from the novel spirit and the scope of this invention.

What is claimed is:

1. A spent catalyst container, comprising:
    an invertible truncated vessel having a base, a top smaller than said base and sloping sidewalls converging towards said top, said vessel comprising an oil-impervious, catalytially resistant material having only one opening;
    said top defining a mouth providing said one opening for ingress and egress of oil and spent catalyst into and out of said vessel;
    a plurality of forklift channels operatively connected to said vessel for receiving tines of a forklift truck to permit said vessel to be inverted from an upright position for ingress of oil and spent catalyst into said vessel to an inverted position for egress of oil and spent catalyst out of said vessel, said forklift channels including a pair of substantially parallel upper forklift channels positioned in proximity to said top and a pair of substantially parallel lower forklift channels positioned in proximity to said base; and
    a pair of substantially parallel grab hook channel plates positioned laterally outwardly and adjacent said upper forklift channels, said grab hook channel plates being positioned below said top and defining monorail-and bridge crane-receiving slots for alternatively receiving grab hooks of a monorail transport carrier of an overhead monorail and grab hooks of a bridge crane to facilitate transport by both a monorail and a bridge crane.

2. A spent catalyst container in accordance with claim 1 including trunnions operatively secured to said vessel for receiving hooks extending downwardly from spanner bars of an overhead crane to accommodate manual inversion of said vessel.

3. A spent catalyst container in accordance with claim 1 including a cover for closing said opening, a support frame connected to said vessel, and converging wedge means comprising converging guide rails connected to said support frame for wedgingly securing said cover when said cover is detached from said opening during inversion of said vessel.

4. A spent catalyst container, comprising:
    a rotatable frusto-conical bin having a substantially planar rectangular base providing a bottom, a circular top substantially smaller than said bottom and positioned in substantially parallel horizontal relationship with said bottom, upright wear plates extending substantially vertically from said rectangular base, said wear plates being of about the same size and including substantially parallel longitudinal wear plates and substantially parallel lateral wear plates, elongated frusto-conical walls extending between and connecting said wear plates to said circular top, said frusto-conical walls having a rectangular cross section as viewed from said top, said bin comprising a substantially rigid, oil-impermeable catalytically resistant metal and having a volumetric center, said top having a substantially horizontal port defining an access opening for input and discharge of oil and spent catalyst, said access opening providing the only opening in said vessel and cooperating with said bin for enhancing environmental protection by substantially preventing leakage of spent catalyst and oil from said bin on roadways during transport, and said bin including a circular lid for detachably closing and sealing said opening;
    a rectangular frame assembly having substantially vertical posts extending upwardly from each corner of the rectangular base to about the height of said top, substantially parallel longitudinal beams extending longitudinally between and connecting said posts at about the height of the volumetric center of said bin, substantially parallel lateral beams extending laterally between and connecting said posts at a position spaced below but in proximity to said top, a substantially rectangular wire mesh-grid support platform supported upon and secured to said posts and positioned in general coplanar alignment with and about said top for providing access and support of personnel about the top of said bin;

grab hook channel plates providing lateral wall portions, said wall portions secured to said platform and said lateral beams and against said posts, said wall portions defining generally pentagon-shaped monorail- and bridge crane-receiving slots for alternately receiving grab hooks of a monorail transport carrier of an overhead monorail and grab hooks of a bridge crane to facilitate transport by both a monorail and a bridge crane;

portolock castings providing legs extending downwardly from said rectangular base adjacent said posts for engagably receiving portolock pins of a flatbed truck trailer;

substantially parallel upper forklift channels secured against said lateral wall portions and said lateral beams and extending longitudinally across said frame assembly for receiving upper tines of a rotatable forklift truck;

substantially parallel lower forklift channels extending below and longitudinally across said rectangular base for receiving lower tines of a rotatable forklift truck; and said upper and lower forklift channels cooperating with each other and said tines to facilitate rotation of said bin from a normally upright input position when transporting, storing, and filling said bin with oil and spent catalyst to an upside-down discharge position when discharging oil and catalyst from said bin and vice versa.

5. A spent catalyst container in accordance with claim 4 including lid-retention guide rails connected to said support platform.

6. A spent catalyst container in accordance with claim 5 wherein said lid-retention guide rails are substantially L-shaped, in cross-section and straight, said rails being positioned at an angle of inclination relative to each other and having diverging ends and converging ends, said diverging ends spaced from each other and spanning a distance substantially greater than the diameter of said circular lid to define an access mouth for entering and removing said lid from said lid-retention guide rails, said converging ends spaced from each other and spanning a distance substantially less than the diameter of said lid so that said lid can be snugly held and securely engaged by said lid-retention guide rails when said lid is wedgingly inserted between said guide rails through said mouth.

7. A spent catalyst container in accordance with claim 6 wherein said diverging ends of said lid-retention guide rails diverge generally in the direction of said opening in the top of said bin and said guide rails cooperate with each other to firmly hold said lid when said lid has been detached from said opening and said bin is rotated to an upside-down discharge position.

8. A spent catalyst container in accordance with claim 5 including spring-loaded toggles for detachably connecting said lid to said support platform.

9. A spent catalyst container in accordance with claim 4 including trunnions extending outwardly from about the center of said longitudinal beams to facilitate auxiliary spanner bar-rotation of said bin.

10. A spent catalyst container in accordance with claim 4 incluidng a limit switch-tripping pin operatively connected to said bin adjacent said base for indicating the presence of reactor oil and spent catalyst in said bin.

11. A spent catalyst container in accordance with claim 4 said lower forklift channels are positioned closer together than said upper forklift channels for enhancing said rotation of the container and to minimize stresses during said rotation.

* * * * *

UNITED STATES PATENT OFFICE
CERTIFICATE OF CORRECTION

Patent No. 4,662,669                  Dated May 5, 1987

Inventor(s) MICHAEL E. ERICKSON, ROMAN T. PLICHTA, DANIEL F. RAJANAYAKAM

It is certified that error appears in the above-identified patent and that said Letters Patent are hereby corrected as shown below:

Patent

| Column | Line | | |
|--------|------|---|---|
| 1 | 7 | "hydro-treater" should be | -- hydrotreater |
| 1 | 37 | "catalst" should be | -- catalyst -- |
| 2 | 8 | "4,474,507" should be | -- 474,507 -- |
| 10 | 52 | "1000°" should be | -- 1000+° -- |
| 16 | 28 | "incluidng" should be | -- including -- |
| 16 | 32 | "claim 4 said" should be | -- claim 4 wherein said -- |
| 13 | 27 | "of" should be | -- to -- |

Signed and Sealed this

Fifth Day of April, 1988

*Attest:*

DONALD J. QUIGG

*Attesting Officer*      *Commissioner of Patents and Trademarks*